United States Patent Office 2,723,965
Patented Nov. 15, 1955

2,723,965

VINYL RESIN COMPOSITIONS COMPRISING A POLYVALENT METAL SALT OF AN ACID CONTAINING A THIOETHER GROUP

William E. Leistner, Brooklyn, Arthur C. Hecker, Richmond Hill, and Olga H. Knoepke, Brooklyn, N. Y.

No Drawing. Application November 19, 1952,
Serial No. 321,518

7 Claims. (Cl. 260—45.75)

This invention relates to stabilized polymeric compositions containing halogen atoms and particularly to vinyl resins with admixed salts of mercapto organic acids, that is, acids containing a thioether group, which are useful in inhibiting deterioration of such halogen-containing polymers by the action of heat or light or both. Such exposures, especially that of heat, occur during the commercial fabrication of polymeric bodies. Light exposure is not a serious factor during fabrication but may occur throughout the life of the fabricated material. Thermal or light deterioration results in discoloration, embrittlement and loss of strength of halogen-containing polymers.

To overcome these undesirable characteristics, it has become common practice to incorporate with such polymeric materials, various compounds which inhibit the tendency of halogen-containing polymers to break down upon exposure to heat and light. Such materials are known as stabilizers.

Some of the earliest stabilizers used in the field were various soaps of fatty organic acids. These included soaps such as lead stearate, barium stearate, barium ricinoleate, cadmium 2-ethyl hexoate, strontium laurate, etc. These were used alone or in combination.

There are many objections to the use of this group of stabilizers. They are not satisfactorily effective during prolonged heating at high temperatures. Usually these stabilizers are not very compatible with the polymer and display a tendency to bloom to the surface; this blooming tendency interferes with such subsequent processing as heat sealing and printing; with the exception of the lower member acids these stabilizers are generally insoluble in organic solvents and thus present a problem of obtaining easy and uniform dispersion in the polymeric composition. The melting point of some of these soaps is higher than processing temperatures so that a lubricating effect is not obtained and uniform dispersion is difficult.

The present invention is based upon the discovery that particularly satisfactory results can be had by employing as a stabilizer for halogen-containing polymeric compositions, the heavy metal salts of a mercapto acid having the empirical formula:

R—S—Y—COOMe in which R is an aryl group or an alkyl group having not more than 18 carbon atoms, Y is an alkylene group containing 1–5 carbon atoms, as for example, —CH$_2$—, or —CH$_2$—CH$_2$—, or —CH$_2$—CH(CH$_3$)—, or —CH(CH$_3$)—CH$_2$—, and Me is any metal other than an alkali metal. We prefer to produce the mercapto acid from acrylic, methacrylic or crotonic acid or their derivatives such as the esters or the nitriles and accordingly the empirical formula of our preferred embodiment may be written:

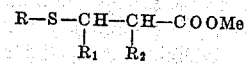

in which R is a monovalent hydrocarbon group, that is, either an aryl group or an alkyl group, containing 1–18 carbon atoms and for best results 4–18; R$_1$ and R$_2$ are either hydrogen or methyl but at least one of them is hydrogen; and Me represents metal other than an alkali metal. Examples of R are phenyl, tolyl, xylyl, butyl, octyl, and dodecyl.

Examples of stabilizers that illustrate this type formula and may be used are: Barium, cadmium or zinc salt of any one of the following acids:

Beta (tertiary dodecyl mercapto) alpha methyl propionic acid

Beta (2-ethyl hexyl mercapto) propionic acid.

The acid in which the 2-ethyl hexyl and the tertiary dodecyl groups in compounds named above are replaced by other alkyl groups containing 4 to 18 carbon atoms as, for instance, n-butyl, n-dodecyl, and tertiary octyl. Acid representing replacement of the propionic acid derivatives above by the corresponding acetic acid derivatives.

In the type formula first given —Y— in the acetic acid series is —CH$_2$—, in the propionic acid series —CH$_2$.CH$_2$—, and in the methyl propionic acid series —CH(CH$_3$)—CH$_2$— or —CH$_2$—CH(CH$_3$)—.

Our stabilizers have many advantages over the conventional soaps used heretofore:

(a) They are much more effective. We feel that this is due to an antioxidant effect of the sulfur group whereby the thioethers are converted into sulfoxides and sulfones.

(b) The metal salts of our invention possess lower melting points than the fatty acid salts. As an example, the barium soaps of most fatty acids soften but do not melt at high temperatures. The barium soaps of our mercapto acids possess melting points which are lower than processing temperatures.

(c) The metal salts of our invention are soluble in cheap organic solvents. The metal salts of fatty acids are generally not soluble.

(d) Our metal salts are completely compatible with the polymeric compositions and do not exhibit any blooming tendency.

The methods of preparing these compounds are available in the literature and therefore are not described in detail at this time, but speaking generally they can be made by reaction involving an acrylic, methacrylic or crotonic acid (or one of their derivatives) with an alkyl or aryl mercaptan such, for instance, as the methyl-ethyl-, n-butyl-, tertiary butyl-, n-octyl-, tertiary octyl-, n-dodecyl-, tertiary dodecyl mercaptan, benzyl-mercaptan or the like. After preparing the mercaptan (thioether) acid, the desired metal salt may be prepared in known ways.

These salts of mercapto acids which we have found to be particularly beneficial are the alkaline earth metals (barium, strontium, calcium, and magnesium), cadmium, lead (in either the normal or basic salts), zinc, and tin. These salts may be used alone or in combinations, but we obtain best results with mixtures of two or more of them. They are incorporated into the halogen-containing polymers in the usual manner employing from 0.5% to 10% of the salt or mixed salts on the weight of the resin. Larger proportions may be used but without material increase in the stability of the compounded plastic, whereas lower proportions will give products that lack the stability required by most commercial processes.

As to materials used, the resin is a vinyl halide resin, this term being used to include vinyl halide polymers; copolymers with vinyl acetate, vinylidine chloride, and also dialkyl fumarate or maleate, or other alkyl esters of monoolefinic acids; and also vinylidine chloride polymer. The vinyl halide used is ordinarily and preferably the chloride, although others such as the bromide and fluoride may be used. As the alkyl in the esters recited, we use any alkyl, as the dibutyl, dihexyl, and di-2-ethyl hexyl esters.

Other conventional materials, such as any usual plasticizer, coloring substance, and inert material, may be incorporated into the vinyl resin composition in usual amounts and for the usual compounding purposes.

Examples of plasticizers are di-2-ethyl hexyl phthalate, tricresyl phosphate, and di-isooctyl adipate. In general, the plasticizer selected must be substantially non-volatile under conditions of use and heat and light stable. It must be a solvent for the resin and compatible in the proportion used with the resin at all temperatures of use.

The plasticizer, if any, is incorporated in the proportion of 1 to 100 parts for 100 parts of the resin, the properties of the product varying with the proportion of plasticizer and the proportion of plasticizer being not critical.

GENERAL METHOD

In general the method of making our plastic compositions is as follows:

Weigh the vinyl resin into a dry blender and then add to it plasticizer, our stabilizer, colors, pigments and fillers as necessary. The whole mass is then agitated, as by tumbling, to produce a uniform blend. The material is then transferred to a Banbury mixer where it is fused or fluidized at elevated temperature. The material is then dropped and transferred to a warmup mill and from the mill to a 3 or a 4 roll calender. Here the material is sheeted out in the form of a film of desired gage.

The above is the procedure for forming a film.

In making solutions of such compositions, the material is sheeted out in strips directly from the warmup mill and then dissolved in a churn or suitable mixer after the addition of the selected solvent.

To make extruded products, the sheeted product is transferred to an extruder. Here it is formed into sheets or various shapes or pelletized for molding or subsequent extrusion procedures.

Mixing operations and other processing steps are conventional except as herein stated to the contrary.

The temperature used in making the blends of the compounds is elevated, to cause fluidizing of the mass or to maintain the mass in semifluid condition during such steps as sheeting or extrusion. The temperatures to be used vary with the particular resin used, in manner well known in the art. These temperatures usually fall within the range 180° to 450° F.

The invention will be further illustrated by description in connection with the following specific examples of the practice of it. In these examples and elsewhere herein all proportions are expressed as parts by weight unless stated to the contrary.

Example 1

The procedure of the general method of making a film is followed.

100 parts of Geon 101 (vinyl chloride polymer) is weighed into a dry blender. 50 parts of plasticizer, in this case dioctyl phthalate, is added next. 2 parts of barium beta (2-ethyl hexyl mercapto) alpha methyl propionate stabilizer is added. The whole mass is agitated by tumbling for a period of one hour. It is then transferred to a Banbury mixer and fused for 10 minutes at a temperature of approximately 300° F. It is then dropped and transferred to a warmup mill whose roll temperatures are also at 300° F. The material is then fed as needed to a 3 or a 4 roll calender. The roll temperatures of the calender range from 280°–350° F. The vinyl compound is calendered into a film at .004 inch or any other desirable gage.

Example 2

The following procedure is used to advantage in making a finished solution of the resin. We use 100 parts of Vinylite VYNS (vinyl chloride and acetate copolymer). This is weighed into a dry blender. 40 parts of plasticizer, in this case, tricresyl phosphate, is added to the dry blender. To this is added 1 part of strontium beta n-octyl mercapto alpha methyl propionate as stabilizer. The whole mass is agitated by tumbling for 30 minutes and then transferred to a 2 roll mill whose roll temperatures are at about 240° F. The mass is fluidized on the mill and then sheeted into strips which are added to a mixture consisting of 3 parts of methyl ethyl ketone atnd 1 part of toluol in a conventional mixer. The compound is agitated at room temperature in the mixer until complete solution results. The proportion of solvent used will vary with the concentration of solution desired as, for instance, from 500 to 3,000 parts of solvent to 100 parts of the vinyl chloride resin used.

Example 3

The procedure of either Example 1 or Example 2 is followed except that the resin used initially is any one of the vinyl halide resins listed above.

Example 4

The procedure of Example 1, 2, or 3 is followed except that the stabilizer used is substituted by an equal weight of any one of the stabilizers given above or a mixture of two or more of them.

Example 5

In the modification of the invention described in this example and also in the succeeding Example 6, the stabilizers used are considered to be new compounds in themselves and also to be made by methods that are new.

The procedure of Example 1, 2, or 3 is followed except that the stabilizer there used is substituted by an equal weight of phenyl ethyl mercapto acetic acid in the form of a salt of a polyvalent metal, that is, a metal having a valence of 2 or more.

In making this stabilizer, the following procedure is used: 104 parts of styrene and 92 of thioglycolic acid were mixed and allowed to stand at ordinary temperatures for 24 hours. To the resulting material there were then added 150 parts of sodium carbonate previously dissolved in 1050 parts of water. The resulting material was then made acidic by the addition of 405 parts of 20% HCl. A white heavy material separated that solidified on standing and which was later recrystallized from petroleum ether. The product is the S-phenyl ethyl mercapto acetic acid referred to above and having the formula $$C_6H_5.CH_2.CH_2.S.CH_2COOH$$

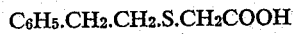

Polyvalent metal salts were made from this acid as follows:

10 parts of the acid were mixed with 8.5 parts of barium hydroxide octahydrate previously dissolved in water. The mixture was then stirred vigorously until the acid was converted to the insoluble barium salt.

The cadmium salt was made by fusion of 10 parts of the acid with 3.5 parts of cadmium oxide and maintaining the mass in fused condition until the conversion of the acid to the cadmium salt was effected.

Example 6

The procedure of Example 1, 2 or 3 is followed except that the stabilizer of these examples is replaced by an alkyl mercapto-acetic acid salt.

These salts are made as follows: diisobutylene or triisobutylene are added to thioglycolic acid. Thus with diisobutylene, there is formed a mixture of 112 parts diisobutylene and 92 of thioglycolic acid. This is allowed to stand for 2 days, during which time the two initial layers of liquid form one clear solution.

The thioether acid so obtained was converted into barium, zinc and cadmium salt. To make the barium salt, a portion of the thioether acid was neutralized and precipitated with barium chloride added in aqueous solution. To make the corresponding zinc or cadmium salts, a portion of the thioether acid solution was mixed with zinc oxide or cadmium oxide and the salt formation effected by evaporation and fusion.

The salts made as described in Examples 5 and 6 are soluble in naphtha, benzene, chloroform, and like organic solvents and are examples of the above type formula $$R-S-Y-COOMe$$

in which Y here represents the methylene group $-CH_2-$. The proportion of polyvalent metal represented by Me here and elsewhere herein is the equivalent weight.

In place of mercaptoacetic acid in these Examples 5 and 6, we may use mercaptopropionic, mercaptovalerianic, and mercaptocaproic acids.

The compositions made as described show abnormally good stability with the vinyl resins even under extreme conditions of heating.

Thus, a composition made as described in Example 1 and then exposed to a temperature of 350° F. for 120 minutes showed only about as much discoloration as was obtained in 15 minutes with a comparable vinyl chloride resin composition made in exactly the same way but containing 2 parts of barium ricinoleate in place of our stabilizer of Example 1.

In another test a mixture of the barium and cadmium salts of the beta (2-ethyl hexyl mercapto) alpha methyl propionic acid was tested in Geon 101 compositions against the same weight of stabilizer material consisting of a mixture of the soaps barium laurate and cadmium naphthenate. In this comparison, the composition with our stabilizers discolored in 120 minutes to a light amber whereas a comparable composition but with the soaps became a mottled dark brown with deep amber in 90 minutes.

A comparison of our type of stabilizers with mixed barium and zinc stearates was also favorable; the composition with our stabilizer mixture discolored in 120 minutes to the extent of the barium and zinc sterate composition in 15 minutes.

This application is a continuation-in-part of our copending application for patent, Serial No. 270,288, filed February 6, 1952, for Vinyl Resin Compositions Comprising a Heavy Metal Salt of a Mercapto Acid, now abandoned.

It will be understood that it is intended to cover all changes and modifications of the examples of the invention herein chosen for the purpose of illustration which do not constitute departures from the spirit and scope of the invention.

What we claim is:

1. A composition of matter comprising a vinyl chloride resin and a stabilizer therefor of the type formula $$R-S-Y-COOMe$$

in which R is a monovalent hydrocarbon group containing 1-18 carbon atoms, Y is an alkylene group containing 1-5 carbon atoms, and Me is a metal selected from the group consisting of barium, strontium, calcium, magnesium, cadmium, lead, zinc and tin.

2. The composition of claim 1 in which R is an alkyl group containing not more than 18 carbon atoms and Me is a metal selected from the group consisting of barium, strontium, calcium, magnesium, cadmium, lead, zinc, and tin.

3. A composition of matter comprising a vinyl halide resin and a stabilizer therefor of the type formula $$R-S-CH-CH-COOMe$$
$$\quad\quad\quad\ |\quad\ |$$
$$\quad\quad\quad R_1\ \ R_2$$

in which R represents an alkyl group containing 1-18 carbon atoms, $R_1$ and $R_2$ represent monovalent substituents selected from the group consisting of hydrogen and methyl, at least 1 of the said substituents being hydrogen, and Me represents a metal selected from the group consisting of barium, strontium, calcium, magnesium, cadmium, lead, zinc and tin.

4. The composition of claim 1 in which the proportion of stabilizer is 0.5-10 parts for 100 parts by weight of the said vinyl chloride resin.

5. A composition of matter comprising a vinyl chloride resin and a heat and light stabilizer admixed therewith, the stabilizer being a salt of the acid of the formula $$CH_3-(CH_2)_7-S-CH_2-CHCOOH$$
$$\quad\quad\quad\quad\quad\quad\quad\quad\quad\quad\ |$$
$$\quad\quad\quad\quad\quad\quad\quad\quad\quad\quad CH_3$$

with a metal selected from the group consisting of barium, strontium, calcium, magnesium, cadmium, lead, zinc and tin.

6. The composition of claim 1 including a substantially non-volatile heat and light stable solvent for the resin, the said solvent being compatible with the resin and serving as a plasticizer therefor.

7. A composition of matter comprising a vinyl chloride resin and a heat and light stabilizer admixed therewith, the stabilizer being a salt of phenylethyl mercaptoacetic acid corresponding to the formula $$C_6H_5-C_2H_4-S-CH_2-COOH$$

with a metal selected from the group consisting of barium, strontium, calcium, magnesium, cadmium, lead, zinc and tin.

No references cited.